US009604823B2

United States Patent
Sheynkman et al.

(10) Patent No.: US 9,604,823 B2
(45) Date of Patent: Mar. 28, 2017

(54) ASSEMBLY FOR ROPING AN ELEVATOR

(75) Inventors: Valery Sheynkman, West Hartford, CT (US); Richard S. Blakelock, Bristol, CT (US); Troy R. Chicoine, Granby, CT (US); Douglas B. LaBrecque, West Springfield, MA (US); Craig A Buckley, Glastonbury, CT (US); William J. Derwin, West Hartford, CT (US)

(73) Assignee: Otis Elevator Company, Farmington, CT (US)

( * ) Notice: Subject to any disclaimer, the term of this patent is extended or adjusted under 35 U.S.C. 154(b) by 1214 days.

(21) Appl. No.: 12/439,284

(22) PCT Filed: Sep. 28, 2006

(86) PCT No.: PCT/US2006/038090
§ 371 (c)(1),
(2), (4) Date: Feb. 27, 2009

(87) PCT Pub. No.: WO2008/039199
PCT Pub. Date: Apr. 3, 2008

(65) Prior Publication Data
US 2010/0000823 A1    Jan. 7, 2010

(51) Int. Cl.
*B65H 59/16*     (2006.01)
*B66B 19/02*     (2006.01)
(52) U.S. Cl.
CPC ..................... *B66B 19/02* (2013.01)
(58) Field of Classification Search
USPC ... 188/64.1, 64.2, 64.3, 64.4, 64.5; 254/391, 254/408; 187/251, 298, 306, 307,
(Continued)

(56) References Cited

U.S. PATENT DOCUMENTS 815,401 A * 3/1906 Breckon ................. 182/141
1,498,048 A   6/1924 Lee
(Continued)

FOREIGN PATENT DOCUMENTS

EP    0006076 A1    12/1979
EP    0670282 A2    9/1995
(Continued)

OTHER PUBLICATIONS

International Search Report and Written Opinion of the International Searching Authority for International application No. PCT/US2006/038090 mailed May 25, 2007.
(Continued)

*Primary Examiner* — Nicholas J Lane
(74) *Attorney, Agent, or Firm* — Carlson, Gaskey & Olds

(57) ABSTRACT

An assembly for controlling a vertically extending member includes a device (22) having a stop member (34) and a speed control member (36) for controlling movement of the vertically extending member such as an elevator load bearing member (32) during a roping procedure. In a disclosed example, the stop member (34) is biased into a stop position where the vertically extending member (32) is locked between a brake pad (60) and a guiding member (54) so that the vertically extending member (32) cannot move relative to the device (22). An example input member for moving the stop member (34) out of the stop position comprises a foot pedal (70) that can be manipulated to control a position of the stop member (34). Absent manual manipulation of the input member, the stop member (34) prevents movement of the vertically extending member (32). In a disclosed example, a speed control member (36) comprises a pad (80) that selectively engages a vertically extending member (32) responsive to manual manipulation of a handle (84) for
(Continued)

moving the pad (80) relative to a base (40) of the device (22).

16 Claims, 3 Drawing Sheets

(58) Field of Classification Search
USPC .................................................. 187/377–379
See application file for complete search history.

(56) References Cited

U.S. PATENT DOCUMENTS

| | | | | |
|---|---|---|---|---|
| 1,921,627 | A * | 8/1933 | Lucchesi | 188/65.1 |
| 2,268,050 | A * | 12/1941 | McIntosh | 182/112 |
| 2,708,525 | A * | 5/1955 | Woleslagle | 212/179 |
| 2,939,550 | A * | 6/1960 | Puttre | 188/65.1 |
| 2,991,526 | A | 7/1961 | Kuebler | |
| 3,207,263 | A | 9/1965 | Cull | |
| 3,327,999 | A * | 6/1967 | Mitchell | 24/134 R |
| 5,033,586 | A * | 7/1991 | Richards et al. | 187/259 |
| 5,350,270 | A * | 9/1994 | Stallard et al. | 414/276 |
| 5,447,211 | A | 9/1995 | Sors | |
| 5,579,865 | A | 12/1996 | Butler et al. | |
| 6,308,806 | B1 * | 10/2001 | Nielsen | 188/24.11 |
| 6,948,594 | B2 * | 9/2005 | Hossler | 188/65.1 |
| 7,108,099 | B2 * | 9/2006 | Ador | 182/5 |
| 8,069,955 | B2 * | 12/2011 | Aulanko et al. | 187/254 |
| 2003/0209121 | A1 * | 11/2003 | Wei | 83/438 |
| 2005/0284705 | A1 * | 12/2005 | Aulanko et al. | 187/266 |
| 2008/0296088 | A1 | 12/2008 | Horn | |

FOREIGN PATENT DOCUMENTS

| | | |
|---|---|---|
| FR | 2543123 A1 | 9/1984 |
| JP | 55-90682 | 12/1953 |
| JP | 5310799 | 3/1978 |
| JP | 5917313 | 5/1984 |
| JP | 5097338 A | 4/1993 |
| JP | 10087220 | 4/1998 |
| JP | 11322221 H | 11/1999 |
| JP | 2001233563 A | 8/2001 |
| JP | 2004345763 | 12/2004 |
| JP | 2005015071 A | 1/2005 |
| SU | 274737 | 1/1971 |
| SU | 541760 | 3/1977 |
| SU | 660913 A1 | 5/1979 |

OTHER PUBLICATIONS

International Preliminary Report on Patentability for International application No. PCT/US2006/038090 Feb. 26, 2009.
Examination Report Under Section 18(3) for Application No. GB0906822.2 dated Apr. 8, 2011.

* cited by examiner

ASSEMBLY FOR ROPING AN ELEVATOR

FIELD OF THE INVENTION

This invention generally relates to controlling a vertically extending member such as those used in elevator systems.

DESCRIPTION OF THE RELATED ART

Elevator systems often include a roping arrangement for supporting an elevator car and counterweight within the hoistway. The roping arrangement also provides the ability to position the elevator car as desired in the hoistway.

Installing a roping arrangement for an elevator system can be challenging. One issue faced by installers is that the weight of the roping (e.g., steel ropes, cables or belts) tends to pull one end of the roping downward and the opposite end upward. Depending on the position of the roping within the hoistway relative to sheaves, car position and counterweight position, the portion of the roping closest to an installer may have a tendency to move up or down. In either case, it is important to maintain control over the position of the roping within the hoistway.

After an elevator system has been in use for some time, it may be necessary to replace one or more load bearing members of the elevator roping arrangement. A common technique is to splice together a new load bearing member with an existing load bearing member in the elevator system. Manipulating the old load bearing member is used for routing the new load bearing member about the sheaves within the hoistway. During such an operation, it is important to exercise caution and to maintain control over the load bearing members within the elevator system.

A so-called runaway rope that is effectively freefalling within a hoistway can cause damage to elevator system components and, at the very least, present an inconvenience to an installer who has to gather the fallen rope and reroute it in a desired manner through the hoistway (e.g., about the sheaves, etc.).

There are other scenarios that require such control over an elongated, vertically extending member. Various roping arrangements are used in a variety of contexts. In many, the same or similar issues are presented that require maintaining adequate control over the elongated member.

There is need for a device that will assist an individual in maintaining control over a vertically extending member such as a rope, a chain or a load bearing member during a roping procedure. This invention addresses that need.

SUMMARY OF THE INVENTION

An example device that is useful for controlling a vertically extending member comprises a base that is adapted to be secured in a set position. A speed control member is moveable relative to the base for selectively contacting the vertically extending member for controlling the speed that the vertically extending member moves relative to the base. A stop member is biased into a stop position to prevent movement of the vertically extending member relative to the base. When a sufficient input force is applied by a user to overcome the bias, the stop member will allow the vertically extending member to move relative to the base.

In one example, the stop member is associated with a foot pedal that can be manipulated by an individual to permit movement of the vertically extending member relative to the base. Whenever the individual removes pressure from the foot pedal (inadvertently or intentionally), the stop member automatically moves into the stop position and prevents any movement of the vertically extending member relative to the base.

In one example, the speed control member is associated with a handle that is manually moveable by a user. Appropriately manipulating the handle allows for moving the stop member relative to a vertically extending member. In one example, increased pressure on the vertically extending member applied by manually manipulating the handle corresponds to decreasing the amount of speed with which the vertically extending member moves relative to the base.

A disclosed example is particularly well suited for being secured in a desired position on top of an elevator car so that an individual can be on top of the elevator car for roping the elevator while maintaining a desired amount of control over movement of the load bearing member.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Disclosed example assemblies allow for an individual to maintain control over movement of a vertically extending member during a roping procedure, for example. Disclosed examples include a speed control feature and a stop feature that provide enhanced control for roping procedures. Various types of elongated, vertically extending members can be controlled with a device designed according to this invention. An elevator load bearing member and an elevator roping procedure are considered as one example use of the disclosed examples.

Figure 1:
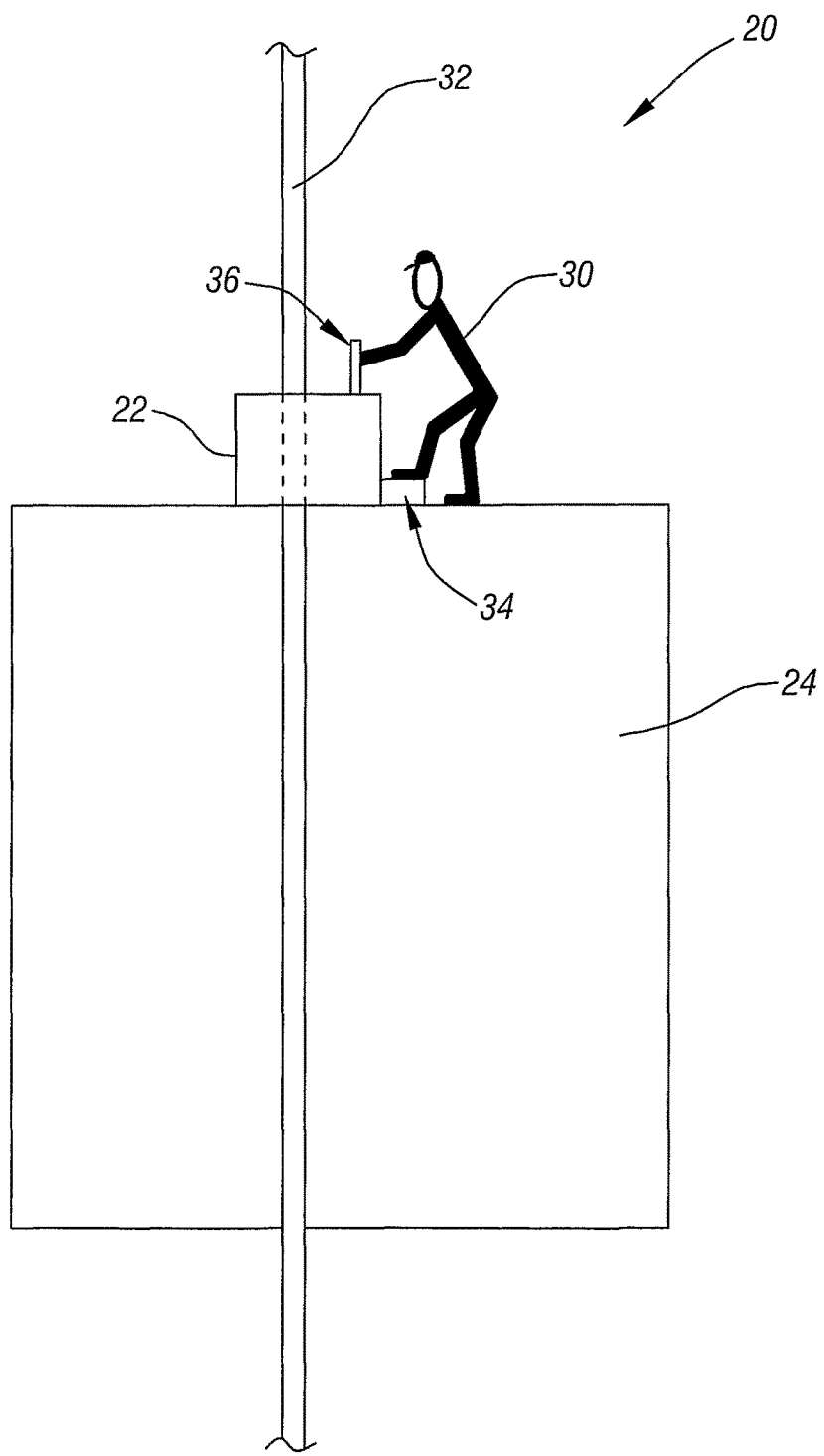
FIG. 1 schematically illustrates an assembly designed according to an embodiment of this invention, which is useful for roping an elevator, for example.

FIG. 1 schematically illustrates an assembly 20 including a device 22 that is secured in a desired position on an elevator car 24. In one example, the device 22 is secured in a fixed position relative to a selected frame member of the elevator car 24. The device 22 allows an individual 30 to control movement of a vertically extending member, which is a load bearing member 32 (e.g., a rope or belt) in this example, relative to the device 22 during a roping procedure.

The illustrated example device 22 includes a stop member 34 that is operative to prevent movement of a portion of the load bearing member 32 engaged by the stop member 34. In one example, the stop member 34 is always biased into a stop position where it engages a portion of the load bearing member 32 to prevent movement of the load bearing member 32 relative to the device 22. Absent a mechanical input to overcome the bias, the stop member 34 remains in the stop position. In the illustrated example, the individual 30 applies a mechanical input (e.g., applies a force) by stepping on an appropriate portion of the device 22 for manipulating the stop member 34 out of the stop position. Any time the individual 30 intentionally or inadvertently removes the foot pressure from the stop member 34, the stop member 34 automatically moves into the stop position to prevent movement of the load bearing member 32 relative to the device 22. In this manner, the stop member 34 is effective to prevent a runaway load bearing member 32 from moving within the hoistway in an uncontrolled or undesirable manner.

The illustrated example device 22 also includes a speed control member 36 that is useful for controlling a speed that the load bearing member 32 moves relative to the device 22. In the illustrated example, the speed control member 36 can be manually manipulated by the individual 30 to achieve a desired amount of speed control. In this example, the speed control member 36 can be controlled by hand while the stop member 34 is controlled by foot. The example combination of a speed control member 36 and stop member 34 provides enhanced control over the load bearing member 30 during an elevator roping procedure.

Figure 2:
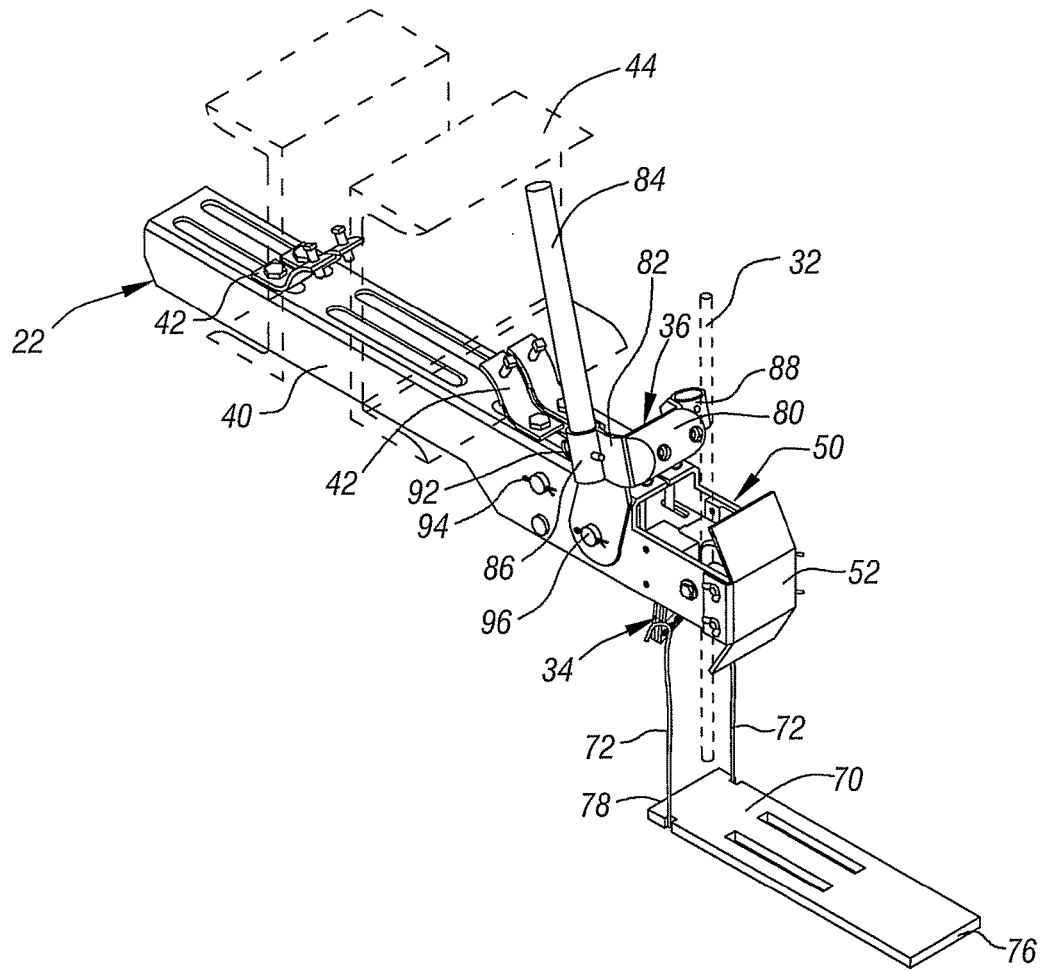
FIG. 2 is a perspective, diagrammatic illustration of one example embodiment.
Figure 3:
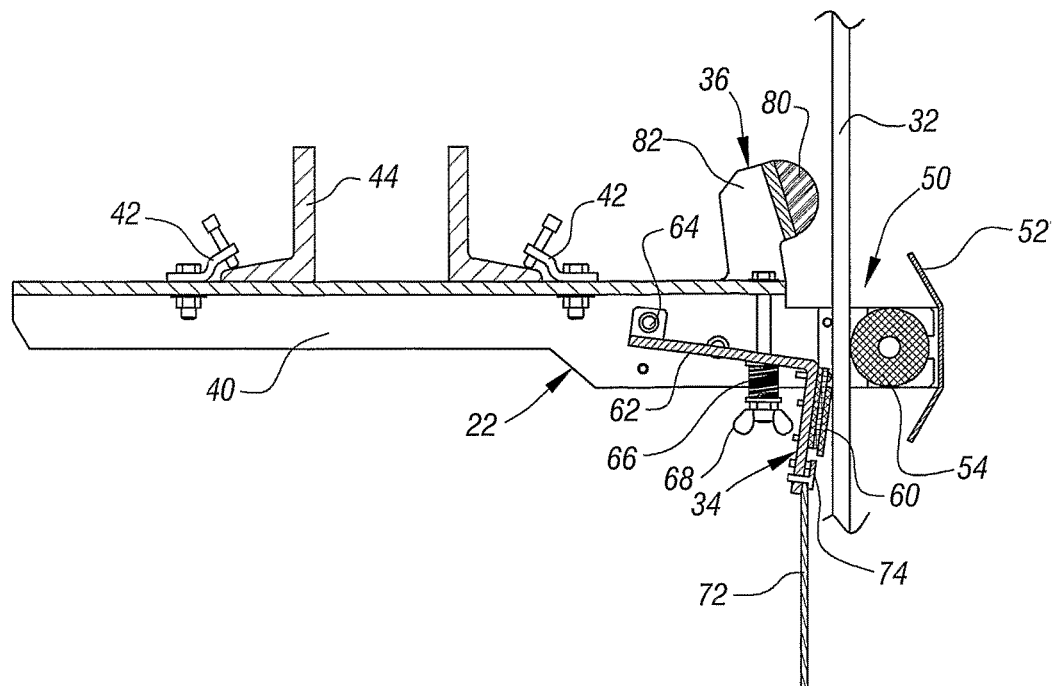
FIG. 3 is a cross-sectional illustration of the embodiment of FIG. 2.

FIGS. 2 and 3 show another example device 22. This example includes a base 40 that is adapted to be secured into a fixed position. In this example, clamping members 42 secure the base 40 relative to a structural member 44. In one example, the structural member 44 is a crosshead beam of an elevator car frame. In another example, the structural member 44 may be a guide rail or hoistway door frame member, for example.

The example base 40 includes an opening 50 through which the load bearing member 32 moves as the load bearing member 32 is manipulated during a roping procedure. A guard 52 is configured to prevent any unwanted objects from entering the opening 50 during a roping procedure. This example includes a guiding member 54 that guides the load bearing member 32 as it moves relative to the base 40. In this example, the guiding member 54 comprises a plurality of rollers that move responsive to movement of the load bearing member 32 when there is contact between the load bearing member 32 and the guiding member 54.

The stop member 34 in this example includes a brake pad 60 that is positioned to directly engage an outside surface on the load bearing member 32 when the stop member 34 is in the stop position. In FIG. 3, the stop member 34 is not in the stop position and the load bearing member 32 is able to move relative to the base 40. In one example, the brake pad 60 comprises a braking material used for other elevator applications such as the brakes used for stopping an elevator car in a desired position within a hoistway.

In the illustrated example, the brake pad 60 is supported on a lever 62 that is pivotally mounted at 64 on the base 40. In the example of FIG. 3, a spring 66 biases the lever 62 in a direction (upward according to the drawing) that urges the brake pad 60 into engagement with the load bearing member 32 when the stop member 30 is in the stop position. In the example of FIG. 3, the load bearing member 32 becomes locked between the brake pad 60 and the guiding member 54 when the stop member 34 is in the stop position. In one example, the guiding member 54 comprises a plastic material selected to avoid introducing wear on the exterior of the load bearing member 32.

In one example, the brake pad 60, the guiding member 54 or both has a contour corresponding to an exterior of the load bearing member 32. For example, when the load bearing member 32 is a round rope, at least one of the brake pad 60 or the guiding member 54 has a concave contour to correspond to the convex exterior of the load bearing member 32. When the load bearing member 32 comprises a flat belt, the brake pad 60 preferably is generally planar and the guiding member 54 is generally cylindrical having a constant outside dimension to provide flat engagement with the flat exterior of the load bearing member 32.

As shown in FIG. 2, the stop member 34 has an associated input member that is useful for applying a mechanical input to overcome the bias of the spring 66 for moving the stop member 34 out of the stop position. In this example, the input member comprises a foot pedal 70 and a cable 72 that is secured to the lever 62 using a clamp 74. In this example, one end 76 of the foot pedal 70 can rest against a stationary surface such as the top of an elevator car or a floor. The cable 72 suspends an opposite end 78 of the foot pedal 70 off of that supporting surface. This allows for an individual to step on and apply pressure to the foot pedal 70, which urges the end 78 toward the supporting surface (e.g., downward toward the top of an elevator car). Sufficient pressure applied to the foot pedal 70 will overcome the bias of the spring 66 and move the stop member 34 out of the stop position. When adequate pressure is applied to the foot pedal 70, the load bearing member 32 is free to move relative to the base 40 during a roping procedure.

In the event that the individual purposefully or inadvertently removes pressure form the foot pedal 70, the stop member 34 automatically moves into the stop position and prevents movement of the load bearing member 32 relative to the base 40. Such an arrangement ensures that an individual performing a roping procedure maintains adequate control over the load bearing member 32 to prevent, for example, a runaway load bearing member within a hoistway.

The illustrated example speed control member 36 includes a pad 80 that selectively engages the load bearing member 32. In one example, the pad 80 comprises a relatively hard plastic material to avoid undesirable wear on the exterior of the load bearing member 32 during the roping procedure. UHMW polyethylene is used in one example. In the illustrated example, the pad 80 is supported on a mounting member 82 that is pivotally supported for movement relative to the base 40.

The illustrated example includes an input member that is manipulable for selectively controlling the position of the speed control member 36, which allows for selectively controlling the speed with which the load bearing member 32 moves relative to the base 40. The illustrated example includes a handle 84 that can be moved by hand to selectively control the speed of movement of the load bearing member 32. As can be appreciated from the illustration, as the handle 84 is manipulated in a generally clockwise direction (according to the drawing), the pad 80 moves into engagement with the load bearing member 32 causing it to deflect relative to the guiding member 54, for example. A larger amount of deflection corresponds to a slower speed of movement due, in part, to increased friction between the load bearing member 32 and the pad 80.

In the illustrated example, the mounting member 82 includes a first lever mount 86 on one side and a second lever mount 88 on another side. In this example, the lever 84 can be selectively positioned in one of the lever mounts 86 or 88 for right-handed or left-handed operation.

One feature of the example of FIGS. 2 and 3 is that it can be readily converted into another configuration for a different installation arrangement.

Figure 4:
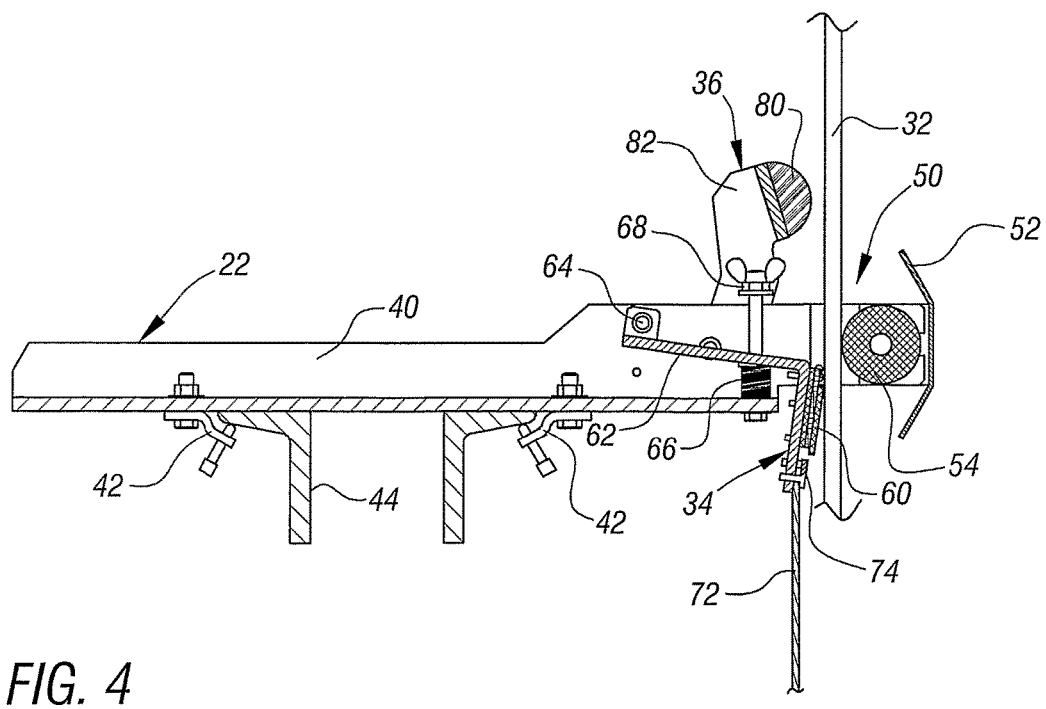
FIG. 4 is a cross-sectional illustration of another example embodiment.

As shown in FIG. 4, the base 40 may be secured on top of a structural member 44 instead of beneath a structural member 44 as shown in FIG. 3. Additionally, the arrangement of the spring 66 relative to the lever 62 may be altered to accommodate such a change in orientation of the base 40. In the example of FIG. 3, the spring 66 reacts against a nut 68 at one end and the lever 64 at another end. The spring 66 tends to expand to urge the lever 64 upward (according to the drawing) for urging the stop member 34 into the stop position. In the example of FIG. 4, the spring 66 is situated to react against the base 40 at one end and the lever 62 at another end. In this example, the nut 68 is positioned relative to the base 40 for securing the spring 66 in a desired position for urging the stop member 34 into the stop position.

The disclosed examples provide enhanced control over a load bearing member during an elevator roping procedure or another vertically extending member during a corresponding procedure.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A device for use in manually controlling vertical movement of an elongated member for an elevator system, comprising:
  a base adapted to be secured in a set position;
  a speed control member that is moveable relative to the base and configured to selectively contact the elongated member and control a speed that the elongated member moves relative to the base;
  a stop member biased into a stop position in which the stop member is configured to prevent movement of the elongated member relative to the base absent an input force applied by a user to overcome the bias, the stop member having an exterior contour corresponding to an exterior of the elongated member to avoid deflecting the elongated member when the elongated member is engaged by the stop member in the stop position;
  a first manual input member comprising one of a foot pedal or a handle configured to be manually moved by the user to overcome the bias and move the stop member out of the stop position; and
  a second manual input member comprising the other of the foot pedal or the handle configured to be manually moved by the user to control a position of the speed control member.

2. The device of claim 1, comprising:
  a lever associated with the stop member that is biased in a direction to move the stop member into the stop position; and
  wherein the first manual input member is associated with the lever for selectively moving the lever in an opposite direction.

3. The device of claim 1, comprising
  a spring for biasing the stop member into the stop position.

4. The device of claim 1, comprising
  a guiding member supported on the base, the guiding member being configured to guide the elongated member for movement relative to the base and wherein the elongated member is locked between the stop member and the guiding member when the stop member is in the stop position.

5. The device of claim 4, wherein the guiding member comprises a plastic material and the stop member comprises a brake material.

6. The device of claim 5, wherein the guiding member comprises at least one roller.

7. The device of claim 1, comprising:
  a first handle mount on one side of the speed control member; and
  a second handle mount on another side of the speed control member and wherein the handle is selectively secured to one of the first handle mount or the second handle mount.

8. The device of claim 1, comprising
  a mounting clamp configured to secure the base on a fixed surface.

9. The device of claim 8, wherein the mounting clamp and the base are configured to cooperate to secure the base in a fixed position against a frame member on an elevator car.

10. The device of claim 1, wherein the speed control member comprises a plastic pad for contacting the elongated member.

11. The device of claim 1, wherein the elongated member comprises an elevator load bearing member.

12. The device of claim 11, wherein the elevator load bearing member comprises a flat belt and the stop member comprises a generally planar contour for engaging the flat belt.

13. The device of claim 11, wherein the elevator load bearing member comprises a round rope and the stop member comprises a concave contour for engaging a correspondingly convex exterior of the round rope.

14. The device of claim 1, wherein the stop member locks the elongated member relative to the base and prevents any movement of the elongated member relative to the base absent an input force applied by a user to overcome the bias and move the stop member out of the stop position.

15. The device of claim 1, wherein the base comprises a portion configured to be secured against a frame member of an elevator car.

16. The device of claim 1, wherein the base is secured to an elevator car.

* * * * *